United States Patent [19]

Kurz et al.

[11] Patent Number: 5,114,639
[45] Date of Patent: May 19, 1992

[54] PROCESS AND APPARATUS FOR THE PRODUCTION OF A FOAM-BACKED CUSHION PORTION

[75] Inventors: Helmut Kurz, Sulzbach-Rosenberg; Martin Stoeberl, Schwarzenfeld, both of Fed. Rep. of Germany

[73] Assignee: Grammer AG, Amberg, Fed. Rep. of Germany

[21] Appl. No.: 578,066

[22] Filed: Sep. 5, 1990

[30] Foreign Application Priority Data

Sep. 13, 1989 [DE] Fed. Rep. of Germany ....... 3930527

[51] Int. Cl.⁵ ............................................. B29C 67/22
[52] U.S. Cl. .................. 264/46.6; 264/46.4; 264/276
[58] Field of Search .............. 264/40.3, 46.6, 46.8, 264/46.4, 500, 276

[56] References Cited

U.S. PATENT DOCUMENTS

| | | | |
|---|---|---|---|
| 3,943,215 | 3/1976 | Grune et al. | 264/46.8 |
| 4,959,184 | 9/1990 | Akai et al. | 264/40.3 |
| 4,971,541 | 11/1990 | Onnenberg et al. | 264/46.8 |
| 4,976,414 | 12/1990 | Yanagishita | 264/40.3 |

FOREIGN PATENT DOCUMENTS

63-137810 6/1988 Japan ........................ 264/46.8

Primary Examiner—W. Gary Jones
Assistant Examiner—Allan R. Kuhns
Attorney, Agent, or Firm—Elliot M. Olstein; Raymond J. Lillie

[57] ABSTRACT

In a process and apparatus for the production of a foamed-backed cushion portion comprising a foam core and a cover, a cover portion is introduced into a first mold portion of a mold. The cover portion is secured in position between the first mold portion and a second mold portion along peripherally extending contact portions therebetween, the mold forming a mold cavity when closed. A reaction mixture introduced into the mold cavity foams up and fills the mold cavity and is thus joined to the cover portion. To prevent air from passing out of the mold cavity between the contact portions the mold is sealed in the region of the contact portions by means of a flow of a gaseous flow agent which is directed from the contact portion of at least one mold portion towards the oppositely disposed contact portion of the other mold portion. An elastically yielding sealing element may be provided between the mold portions to improve the sealing action.

3 Claims, 1 Drawing Sheet

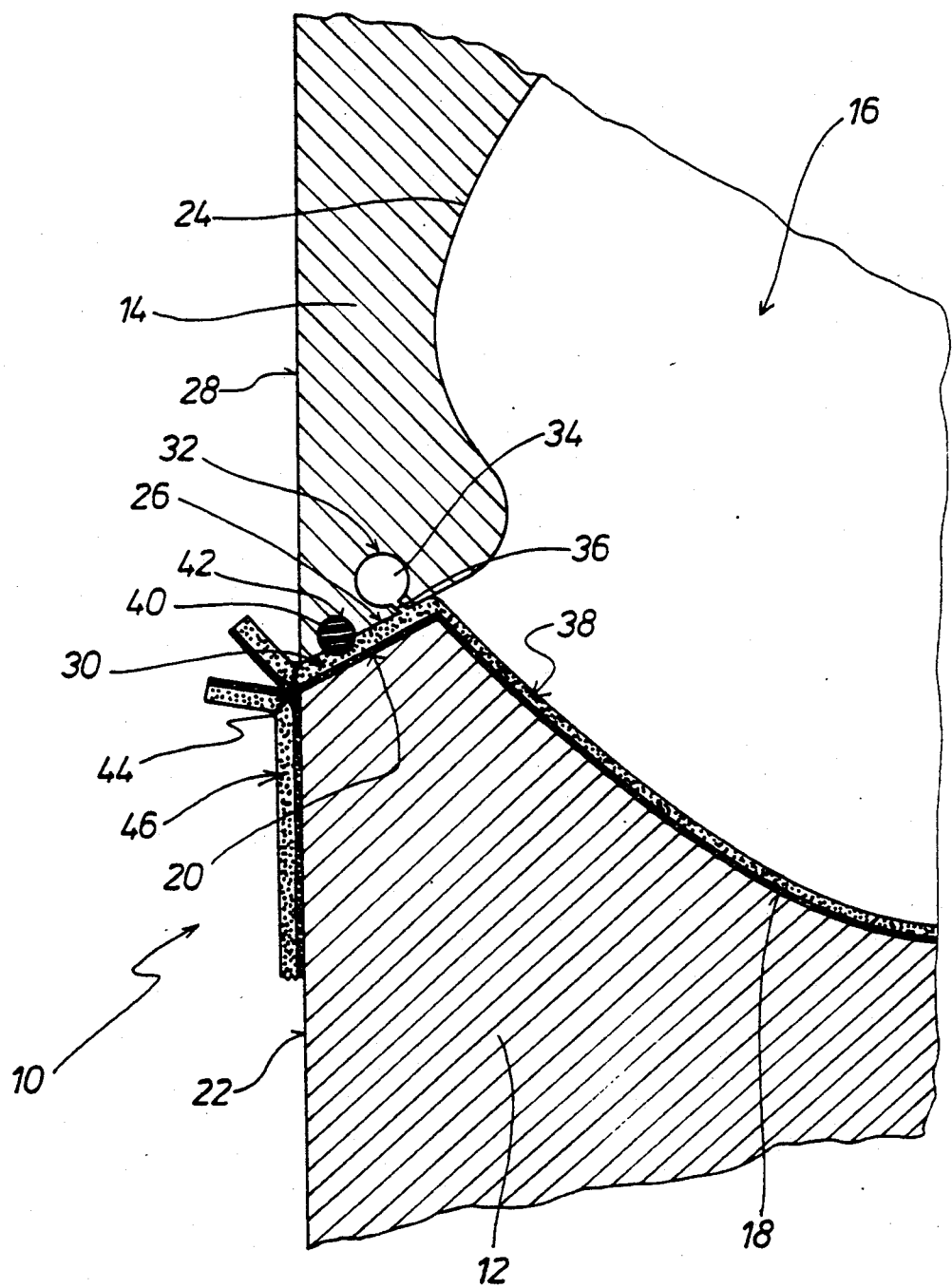

5,114,639

PROCESS AND APPARATUS FOR THE PRODUCTION OF A FOAM-BACKED CUSHION PORTION

BACKGROUND OF THE INVENTION

A form of process for the production of a foam-backed cushion portion comprising a foam core with a cover thereon involves introducing a cover portion to form the cover of the cushion portion into the first mold portion of a mold for producing the cushion portion. The cover is fixed by a second mold portion of the mold, along peripherally extending contact portions between the two mold portions, and thus the mold is closed to provide a mold cavity with the cover portion bearing against a part of the internal surface thereof. A reaction mixture is then introduced into the mold cavity and foams up during reaction thereof, thereby filling the foam cavity and at the same time becoming joined to the cover portion in the mold cavity.

Hitherto such a procedure can be effected by means of an apparatus in which the peripherally extending contact portions of the first and second mold portions have generally sharp edges in order to ensure that the mold portions are securely sealed with respect to each other, or the apparatus used does not have sealing edges of that kind along the peripherally extending contact portions, with the result that the mold cavity is then no longer soundly sealed. However the first form of the apparatus which has the sealing edges to seal off the mold cavity suffers from the disadvantage that the sealing edges become impressed into the cover portion which is for example a portion of textile material coated with a lining on the inward side thereof which is towards the foam core of the cushion portion, and that impression can be at least seen by the eye in the cover of the cushion portion, which has a generally detrimental effect on the visual appearance of the cushion portion. In extreme cases, it is even possible for the sealing edges of the mold portions to actually cut into the cover portion in the mold cavity. It is in order to prevent the sealing edges of the mold portions from pressing into or even cutting into the cover portion that recourse may be made to the second form of the apparatus which does not have sealing edges of that kind. In that case however, as already indicated, it is no longer possible to ensure that the mold cavity is properly sealed off along the peripherally extending contact portions where the first and second mold portions meet. As a result, although the appearance of the cover is improved by virtue of eliminating the pressure marks formed by the sealing edges of the first form of apparatus discussed above, the reaction mixture which foams up in the mold cavity can penetrate between the mold portions and in an extreme case through the cover portion, and that can result in undesirable hardening of the cover portion and therewith equally undesirable hardening of the cushion portion itself.

SUMMARY OF THE INVENTION

An object of the present invention is to provide a process for the production of a foam-backed cushion portion which remedies the above-discussed shortcomings.

Another object of the present invention is to provide a process for the production of a foam-backed cushion portion such as to produce a tidy cushion portion of acceptable visual appearance.

Yet another object of the present invention is to provide a foam-backed cushion portion production process which is such as to provide a satisfactory result without involving major additional process steps.

Still a further object of the present invention is to provide an improved apparatus for the production of a foam-backed cushion portion, which is of a simple structure while affording reliability of operation and satisfactory product quality.

In accordance with the present invention, in a first aspect thereof, these and other objects are achieved by a process for the production of a foam-backed cushion portion comprising a foam core and a cover, wherein a cover portion which is to provide the cover of the cushion portion is introduced into a first mold portion of a mold, and the cover portion is then fixed with respect to a second mold portion of the mold along a common contact portion extending around the mold cavity between the first and second mold portions, the mold in the closed condition defining a mold cavity therewithin, in which the cover portion is disposed. A reaction mixture is introduced into the mold cavity and foams up during reaction thereof to fill the mold cavity and be joined to the cover portion therein. In the region of the common contact portion between the first and second mold portions, gas is prevented from escaping from the mold cavity so that a gas cushion is formed in the region of the cover portion which is towards the mold. The gas or air cushion in the region of the cover portion which is towards the mold, with the gas or air possibly being under an elevated pressure, prevents the reaction mixture as it foams up from penetrating too far into the cover or penetrating through the cover. The gas pressure which occurs depends on the reaction procedure involved in foaming up of the reaction mixture in the mold cavity.

In a preferred feature of the process of the invention, the gas is prevented from flowing out of the mold cavity through the common contact portion of the first and second mold portions by virtue of the mold being sealed off along the common contact portion by means of a flow, which is directed into the mold cavity, of a gaseous flow agent. In that way the gaseous flow agent forms a counter-flow in relation to the gas which seeks to pass through the common contact portion between the first and second mold portions in order thereby to escape from the mold cavity during reaction of the reaction mixture, so that the inwardly directed flow of gaseous flow agent thus prevents the gas seeking to escape from the mold cavity from flowing through the common contact portion at the location where the first and second mold portions meet. The gaseous flow agent may be for example air or any other suitable gas. The pressure of the flow of the gaseous flow agent, inwardly of the mold cavity, is dependent on the pressure in the region which is towards the mold of the gas or air cushion formed in the cover portion.

In another preferred feature of the process of the invention the flow of the gaseous flow agent is directed through the cover portion, thereby producing what might be referred to as an air lock effect preventing the gas from passing through the common contact portion between the mold portions. At the same time however that means that the reaction mixture is also reliably prevented from penetrating through the common contact portion between the mold portions.

In accordance with another preferred feature for sealing off the mold along the peripherally extending contact portion of the mold portions, the mold may be sealed off along the common contact portion by an elastically yielding sealing means. The sealing means may be provided in particular on the side of the common contact portion which is away from the mold cavity. That arrangement provides that a primary sealing effect is produced by the above-discussed flow of gaseous flow agent, and the sealing means may be such as to provide a sealing effect while at the same time avoiding an undesirable permanent impression being formed in the cover portion.

In accordance with the invention, in a second aspect, the foregoing and other objects are achieved by an apparatus for the production of a foam-backed cushion portion comprising a foam core and a cover, including a mold comprising at least first and second mold portions adapted to be joined together along a peripherally extending contact portion, thereby to define a mold cavity. The mold has a sealing means along the peripherally extending contact portion. In a preferred feature the sealing means may comprise a nozzle means for producing a flow of a gaseous flow agent, which is directed towards an oppositely disposed mold portion of the mold. The nozzle means may be a slit-type nozzle which extends uninterruptedly around at least one of the mold portions, at the peripherally extending common contact portion therebetween. Instead of such a nozzle means it is also possible for the nozzle means to be formed with spaced-apart nozzle openings. It will be appreciated however that a slit-type nozzle arrangement as referred to above can provide a better sealing action in respect of the mold cavity than a sealing means comprising spaced nozzle openings.

Preferably the nozzle means is so directed as to direct the gaseous flow issuing therefrom into the cover portion disposed in the mold cavity. That provides an optimum air lock effect which prevents gas seeking to escape from the mold cavity as foaming of the reaction mixture introduced thereinto occurs from penetrating through the cover portion where it is disposed between the co-operating mold portions. In that way it is possible to use a permeable cover, that is to say a cover which does not need to have an air-tight foil thereon. That cover provides a cushion portion which, in use in a seat, provides a pleasant level of seating comfort and what might be termed a good seat climate.

The nozzle means may preferably be provided on the mold portion which faces towards the side of the cover portion held in the mold cavity, which faces inwardly of the mold cavity. As already mentioned above, the cover portion may be provided on that surface with a lining of suitable material.

Besides the nozzle means, the sealing means of the apparatus according to the invention may also include at least one elastically yielding profile element to act as a sealing means between the mold portions. The profile element is preferably disposed on the mold portion which faces towards the inwardly facing or rear side of the cover portion disposed in the mold cavity. The profile element is for example an endless element comprising a suitable rubber or plastic material. The profile element enhances the sealing effect which is produced by the nozzle means between the mold portions, without however becoming impressed into the cover portion with the attendant disadvantages thereof.

Further objects, features and advantages of the invention will be apparent from the following description of a preferred embodiment.

BRIEF DESCRIPTION OF THE DRAWING

The single FIGURE of the accompanying drawing is a sectional view of part of a mold for the production of a foam-backed cushion portion.

DESCRIPTION OF THE PREFERRED EMBODIMENT

Referring therefore now to the drawing, shown therein is a part of an apparatus for carrying out a process for the production of a foam-backed cushion portion comprising a foam core and a cover, and more particularly, a part of a mold generally indicated at 10. The mold 10 comprises a first mold portion 12 and a second mold portion 14 which in the mold-closed position define a mold cavity 16. The first mold portion 12 constitutes the main body of the mold, for receiving a portion of cover material for providing the cover of the cushion portion, while the second mold portion 14 is in the form of a cover member for closing the mold cavity 16, or an intermediate frame portion which contributes to defining the mold cavity.

The first mold portion 12 has an internal surface or contour as indicated at 18 defining part of the mold cavity 16, a peripherally extending edge portion 20 which thus extends around the periphery of the mouth opening of the part of the mold cavity 16 defined by the first mold portion 12, and an external surface 22. Similarly, the second mold portion 14 has an internal surface or contour 24 defining another part of the mold cavity, a peripherally extending edge portion 26 which extends around the periphery of the mouth opening of the part of the mold cavity 16 defined by the mold portion 14, and an external surface 28. The two edge portions 20 and 26 form a joint peripherally extending contact portion 30 where the two mold portions 12 and 14 are at least closely associated with each other in the mold-closed position.

The edge portion 26 includes a nozzle means generally indicated at 32 comprising a peripherally extending passage or duct 34 which thus extends around the mouth opening of the mold cavity 16, and a slit-type nozzle 36 which opens to the edge portion 26. It may be noted at this point that the edge portion 20 of the mold portion 12 may have a similar nozzle means, instead of or in addition to the nozzle means 32 at the edge portion 26.

The nozzle 36 is so oriented that it directs a flow of a gaseous flow agent towards the oppositely disposed edge portion of the respective mold portion 12 or 14. That flow prevents the gas which seeks to escape from the mold cavity 16, from issuing therefrom through the common contact portion 30 of the mold portions 12 and 14, or through the piece of cover portion 38 which is clamped in position between the mold portions 12 and 14. The sealing effect at the common contact portion 30 between the two mold portions 12 and 14 is further enhanced by an elastically yielding shaped element 40. The shaped element 40 which may be for example an endless portion of rubber or plastic material or a piece cut from an extrusion of such material is disposed in a recess 42 which is provided for that purpose in the respective mold portion 14 or 12 and which extends around the mold portion 14 or 12 in the respective edge portion 26 or 20 thereof.

Operation of the apparatus according to the invention, for carrying out the process for the production of a foam-backed cushion portion, is as follows:

With the mold portion 14 in a position in which it is moved away from the mold portion 12, a cover portion 38 is arranged on the mold portion 12 in such a way that its side or surface which in the molded foam-backed cushion portion forms the outwardly facing surface thereof, is towards the internal contour 18 of the mold cavity 16 in the mold portion 12. Reference 44 in the drawing identifies a seam which joins to the cover portion 38 a second piece of cover material 46 which has its outward surface facing towards and lying against the external surface 22 of the mold portion 12. The inward surface of the cover portion 38 which in the finished cushion portion is thus towards the foam core thereof faces inwardly of the mold cavity 16.

After the cover portion 28 has been applied by way of its outside surface against the internal contour 18 of the mold portion 12, the mold cavity is closed by the mold portion 14 being brought into the mold-closed position shown in the drawing. It may be noted that for example a reduced pressure may be applied to the cover portion 38 in order to at least assist with the application thereof against the internal contour 18 of the mold portion 12. Prior to, simultaneously with or subsequently to the operation of closing the mold by moving the mold portion 14 into the illustrated position, a reaction mixture is introduced into the mold cavity 16 which foams up while the reaction takes place and completely fills the mold cavity 16. When the reaction mixture foams up in that way, a gas pressure occurs in the mold cavity 16. In order to prevent the gases in the mold cavity 16 from penetrating through the common contact portion 30 at the location where the mold portions 12 and 14 co-operate with each other, with the part of the cover portion 38 clamped therebetween, the nozzle means 32 and the elastically yielding shaped element 40 provide a sealing effect. Thus, the gaseous flow agent issuing from the nozzle 36 is directed towards the oppositely disposed edge portion 20 of the mold portion 12, through the adjacent part of the cover portion 38. The shaped element 40 provides what might be termed a mechanical sealing effect by virtue of co-operating with the surface of the adjacent part of the cover portion 38.

While the reaction of the reaction mixture is taking place, a mechanical connection is provided between the reaction mixture and the inwardly facing surface of the cover portion 38, over at least substantially the entire area thereof. After the reaction has been concluded, the mold portion 14 can be removed from the mold portion 12, whereupon the further cover portion 46 is folded around the foam cushion portion produced in the mold, that is to say around the part of the surface of the foam core which is shaped by the internal contour 24 of the upper mold portion 14, thus resulting in a foam-backed cushion portion which is covered all around by a cover formed by the portions 38 and 46.

The configuration of the sealing means 32, 34 in accordance with the invention not only at least substantially overcomes the problem of marks being impressed into the cover portion, since the only marking made is by the comparatively small shaped element 40, but in addition the flow of gaseous agent produced by the nozzle 36 simultaneously provides for the formation of a gas or air cushion in the edge regions of the cover portion 38, which are towards the mold portion 12 and more specifically the internal contour 18 thereof, and that air or gas cushion prevents the reaction mixture from penetrating through the cover portion 38 so as to prevent undesirable hardening thereof in an area where that is not appropriate, while also ensuring that gas in the mold cavity cannot escape therefrom.

It will be appreciated that the foregoing apparatus structure and operating procedure have been set forth solely by way of example and illustration of the principles of the present invention and that various modifications and alterations may be made therein without thereby departing from the spirit and scope of the invention.

What is claimed is:

1. A process for the production of a foam-backed cushion portion comprising a foam core and a cover, wherein a cover portion for providing the cover of the cushion portion is introduced into a first mold portion of a mold, the cover portion is fixed in position between the first mold portion and a second mold portion along peripherally extending common contact portions between the mold portions, the mold when closed forming a mold cavity, and a reaction mixture is introduced into the mold cavity and foams during reaction thereof to fill the mold cavity and be joined to the cover, wherein a discharge flow of gas from the mold cavity is prevented in the region of the contact portions of the mold portions so that a gas cushion is formed in the cover portion region which is adjacent the mold cavity, and wherein the mold is sealed along said contact portions to prevent gas from escaping from the mold cavity by means of a flow of a gaseous flow agent which is directed from the contact portion of one mold portion towards an oppositely disposed contact portion of the other mold portion.

2. A process as set forth in claim 1, wherein said flow of gaseous flow agent is directed through the cover portion.

3. A process as set forth in claim 1 wherein the mold is sealed along said contact portions at one or both sides by an elastically yielding sealing means.

* * * * *